United States Patent [19]

Audibert et al.

[11] Patent Number: 5,759,962
[45] Date of Patent: Jun. 2, 1998

[54] METHOD FOR INHIBITING REACTIVE ARGILLACEOUS FORMATIONS AND USE THEREOF IN A DRILLING FLUID

[75] Inventors: Annie Audibert, Le Vesinet; Jacqueline Lecourtier, Rueil Malmaison, both of France; Louise Bailey, Comberton; Geoffrey Maitland, Girton, both of Great Britain

[73] Assignee: Institut Francais du Petrole, Rueil Malmaison, France

[21] Appl. No.: 464,117

[22] Filed: Jun. 5, 1995

Related U.S. Application Data

[62] Division of Ser. No. 122,540, Oct. 14, 1993, abandoned.

[30] Foreign Application Priority Data

Jan. 31, 1992 [FR] France .................. 92/01.199

[51] Int. Cl.$^6$ .................................. C09K 7/02
[52] U.S. Cl. ......................... 507/119; 507/224
[58] Field of Search ....................... 507/119, 224

[56] References Cited

U.S. PATENT DOCUMENTS

| | | | |
|---|---|---|---|
| 4,138,381 | 2/1979 | Chang et al. | 260/29.6 TA |
| 4,268,641 | 5/1981 | Koenig et al. | 525/367 |
| 4,351,754 | 9/1982 | Dupré | 524/445 |
| 4,421,902 | 12/1983 | Chang et al. | 507/119 |
| 4,663,385 | 5/1987 | Chang et al. | 507/119 |
| 4,745,154 | 5/1988 | Ruffner | 507/119 |
| 5,242,899 | 9/1993 | Binon | 507/119 |
| 5,362,415 | 11/1994 | Egraz et al. | 507/119 |
| 5,403,821 | 4/1995 | Shoji et al. | 507/119 |

*Primary Examiner*—Philip Tucker
*Attorney, Agent, or Firm*—Antonelli, Terry, Stout, & Kraus, LLP

[57] ABSTRACT

The present invention relates to a method of stabilizing argillaceous rocks containing reactive clays in the presence of water, wherein said argillaceous rocks are placed in contact with an aqueous solution containing a polymer with hydrophilic groups and hydrophobic groups.

5 Claims, 4 Drawing Sheets

METHOD FOR INHIBITING REACTIVE ARGILLACEOUS FORMATIONS AND USE THEREOF IN A DRILLING FLUID

This application is a Divisional application of application Ser. No. 122,540, filed Oct. 14, 1993 now abandoned.

The present invention relates to a method and its application to a fluid, particularly a drilling fluid, said method being designed to inhibit highly reactive argillaceous formations in the presence of water. The method according to the invention consists in particular of bringing the reactive formations in contact with an aqueous solution including hydrophilic and hydrophobic polymers.

A hydrophobic substance is generally defined as being a nonpolar organic substance. A hydrophilic/hydrophobic polymer according to the present invention will be such that the balance between the hydrophilic and hydrophobic units causes this polymer to be water-soluble.

In the area of oil drilling, the problems raised by argillaceous formations are well known. When these formations are drilled using water-based drilling fluids, complex chemical reactions take place within the argillaceous structure by ion exchange and hydration. These reactions result in swelling, crumbling, or dispersion of clay particles in the formation through which the drill passes. Problems also arise in contamination of the drilling fluid by clays, stability of the drilling walls, and migration of fine clay particles contained in a reservoir rock.

In this application, we will use the term "argillaceous formations" to describe geological formations with a certain proportion of clay particles, which proportion can be very large or very small. In the following, the usual abbreviations Hb and Hy will be used to designate hydrophobic and hydrophilic, respectively.

In the oil industry, the problems cited above have been solved in particular by using nonaqueous drilling fluids. For example, by drilling with air, but more commonly with a fluid whose continuous phase is based on liquid hydrocarbon*. However, drilling with these types of mud known as "oil-type muds" has numerous drawbacks: prohibitive cost of fluid, toxicity, and above all pollution of wastes by the oil. Current waste regulations call for treatment techniques and costs such that oil-type mud is often impossible to use.

*This sentence has no main verb - Translator's note.

In this case, the water-based fluids contain water-soluble polymers able to provide a drilling fluid with the necessary characteristics, namely: sufficient viscosity to clean the well properly, and ability to reduce the filtrate and disperse the fine particles. However, these additives are not satisfactory with regard to inhibition of clay swelling when the formations traversed have high reactivity, which is the case in particular in the North Sea.

The systems currently in most widespread use are fluids including polymers and potassium ions. The polymers are often partially hydrolyzed polyacrylamides and/or cationic polymers. These systems have frequently been shown to be ineffective.

U.S. Pat. No. 4,299,710 discloses a drilling fluid composed of a combination in aqueous solution of thickeners such as a copolymer and a polysaccharide. Among other properties, this fluid has the property of limiting clay swelling. However, the copolymer structure described has a molecular weight of at least $25 \times 10^4$ daltons and there is no optimization relationship between the molecular weight and the length of the hydrophobic part. Moreover, it is a complex fluid whose characteristics emerge from the combined effects of the products, and is particularly suited for a drilling fluid with low solids content, particularly a low content of clays.

The present invention relates to a method for stabilizing rocks containing reactive clays in the presence of water. With this method, said argillaceous rocks are placed in contact with an aqueous solution containing a polymer with hydrophilic groups (Hy) and hydrophobic groups (Hb). The groups are designed to inhibit swelling and/or dispersion of said argillaceous rocks.

The hydrophobic groups contain between 1 and 30 alkyl groups, with the molecular proportion of said hydrophobic groups being between 5 and 60%, and said polymer has at least one of the following structures:

Structure a) of the (Hb)-(hydrophilic chain Hy)-(Hb) type wherein the hydrophilic chain Hy is composed of a polyoxyethylene (or POE) chain with the following general formula:

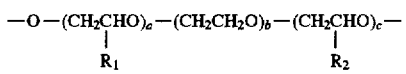

where $R_1$ and $R_2$ are each: H, a $C_1$–$C_{30}$ alkyl, aryl, or alkylaryl radical, where a, b, and c may respectively assume the values of: 0 to 50, 0 to 150, and 0 to 50, and (a+b+c) is not zero, and in which the hydrophobic groups Hb are alkyl or alkyl-aryl chains connected to the hydrophilic chain Hy by groups containing at least one urethane function with the following general formula:

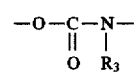

where $R_3$ is H or a $C_1$–$C_{30}$ alkyl radical, a cycloalkyl radical, a $C_6$–$C_{30}$ phenyl radical which may be substituted by one, two, or three $C_1$–$C_{30}$ alkyl radicals, or a fatty ester of the sorbitan type, the molecular weight of said polymer is greater than 27,000 daltons.

Structure b1) of the -(Hb)-(Hy)- type with a statistical distribution, said structure b1) being a polyacrylamide derivative resulting from copolymerization of acrylamide with a hydrophobic comonomer, and wherein the hydrophilic group is acrylamide, possibly in the form of acrylic acid, acrylate, or sulfonate according to the following formula:

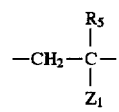

where $R_5$ is H or $CH_3$ and $Z_1$ is COOH or $CONH_2$ or $CONHR"_1$, $R"_1$ is a $C_1$–$C_{30}$ substituted alkyl-, aryl-, or alkylarylsulfonate radical.

Structure b2) of the -(Hb)-(Hy)- type with a statistical distribution, said structure resulting from radical polymerization of ethylenic monomers containing carboxylic functions, particularly an acrylate/alkyl acrylate copolymer with the following formula:

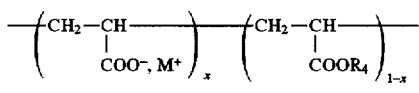

where x is between 0.4 and 0.8, M is H or Na or K or any other monovalent ion, and where the length of the hydrophobic groups $R_4$ is chosen as a function of the molecular weight of the polymer according to the following rules:

For a polymer with a molecular weight less than about $10^5$ daltons, $R_4$ contains at least two carbon atoms.

For a polymer with a molecular weight between approximately $5 \times 10^5$ and $2.5 \times 10^6$ daltons, $R_4$ contains at least four carbon atoms.

Structure c) composed of a principal chain containing units with hydrophilic groups Hy and units with hydrophobic sidechains Hb, constituting a "comb-type" structure, said structure having partially esterified carboxylic acid groups whose hydrophilic ester groups are of the POE type, and units with a hydrophobic sidechain having the following general formulas:

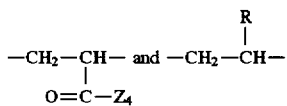

where R is a hydrophobic chain and $Z_4$ is OH or (POE) $R'_1$, and the molecular weight is greater than approximately 20,000 daltons.

The polymer corresponding to Structure a) may have a hydrophilic chain Hy with the form $(CH_2CH_2O)_b$, where b is 1 to 150, a hydrophobic group Hb with the form $CH_3(CH_2)_{11}$, or

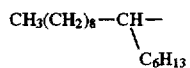

and the groups with a urethane function joining Hb to Hy may be of the formula

1)

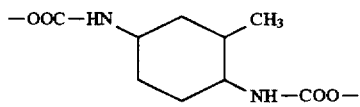

2)

3)

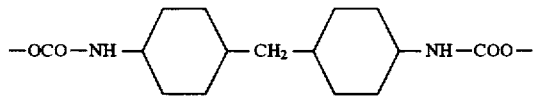

The hydrophobic unit Hb with Structure b1) may have at least one of the following forms:

N-alkylacrylamide, alkyl acrylate, N-substituted acrylamide, or substituted acrylate, whose substituted part is a nonionic surfactant, said hydrophobic unit having the following general formula:

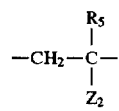

where $R_5$ is H or $CH_3$ and $Z_2$ is $COOR_7$, $COOR'_1$, $CONR_1R'_1$ or $CONR_1R_7$, $R_7$ being a nonionic surfactant composed of an alkyl polyoxyethylene chain and $R'_1$ is a $C_1$-$C_{30}$ alkyl, aryl, or alkylaryl radical.

Cationic units can be introduced into Structure b1), said units having the following general formula:

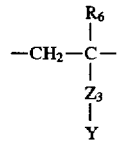

where $R_6$ is H or $CH_3$, $Z_3$ is $(CH_2)_n$, $COO(CH_2)_n$ or $CONH(CH_2)_n$ with n being a number from 0 to 20, and Y is $R_1N^+R'_1R_2$ wherein only one of the three radicals may be H.

The polymer according to Structure b2) may have a value of approximately 0.55 for x, $R_4$ may have four carbon atoms, and said polymer may have a molecular weight of between $5 \times 10^5$ and $2.5 \times 10^6$ daltons, preferably approximately $10^6$ daltons.

The polymer according to Structure b2) may have a value of 0.8 for x, $R_4$ may have four carbon atoms, and said polymer may have a molecular weight of between $10^4$ and $5 \times 10^4$ daltons, preferably approximately $17 \times 10^3$ daltons.

For the polymer with Structure c), R can be a $C_{12}$ to $C_{14}$ alkyl chain and $Z_4$ may be OH or $(POE)_m CH_3$, with m being from 6 to 10.

The method according to the above characteristics may involve an aqueous solution with between 1 and 10 g/liter of hydrophilic and hydrophobic polymer.

The invention also relates to a use of the above method with fluids contacting reactive argillaceous formations, particularly fluids for drilling, fracturing, cementing, well treatment, or assisted recovery.

Patents EP-0,398,576, GB-2,128,659, and EP-0,311,799 in particular disclose polymers or fluids with hydrophobic groups, but none of them relates to inhibition of clay swelling.

The basic idea of the present invention is to determine an optimized structure for a polymer having hydrophilic and hydrophobic groups. The molecular weight must also be optimized as a function of the polymer structure. This is because strong, dense adsorption of this polymer onto argillaceous formations and a highly hydrophobic nature of the layer of this adsorbed polymer are some of the favorable conditions for controlled inhibition of the swelling of argillaceous formations.

One of the teachings of the present invention is the demonstration of certain parameters that allow the engineer to control the clay-inhibiting nature of a solution according to the invention.

The density of the polymer layer obtained by adsorption may be low because the molecular weight is too low, but can be controlled, in particular improved, by optimizing the structure of the polymer.

Likewise, a polymer with too high a molecular weight and too large a proportion of hydrophobic groups may, in certain tests, reveal a good adsorption capacity, particularly to clays, provided the hydrophobic polymer solution according to the invention is not circulated. It has been found that the thickness of the adsorbed layer of certain polymers, not optimized in terms of molecular weight, proportion, and length of hydrophobic chain, was partially destroyed by the dynamic test simulating circulation of a drilling fluid. In this case, the inhibiting nature of such a solution is strongly affected.

The hydrophobic nature of the adsorbed polymer layer limits diffusion of water and ions of the aqueous solution thus inhibiting swelling and/or dispersion of argillaceous formations.

Moreover, it is found that a polymer corresponding to Structure b) has very good resistance to the usual contaminants, particularly calcium ions, and to high temperatures.

Determination of the selected polymer has to do particularly and essentially with the choice of the best-suited structure, the mutual distribution of the hydrophilic and hydrophobic groups, the molecular weight of the polymer obtained, and the nature of the various monomers.

In the present invention, the term "POE" corresponds to the polyoxyethylene chain as defined by the structural formula given above for Structure a).

Reference may be made to the following article: "Polymers in Aqueous Media, Performance through Association", Ed. J. E. Glass, Advances in Chemistry Series, No. 223, ACS 1989.

The hydrophilic/hydrophobic polymer solutions in the context of this invention are alkaline and may include other components designed to provide the fluid containing this solution with other characteristics such as inhibition of swelling of rocks containing clays.

In this invention, the drilling fluids can contain, in aqueous solution, the hydrophilic and hydrophobic polymers described above in order to inhibit the swelling of rocks containing reactive clays that are encountered during drilling. These drilling fluids may in particular be conventional fluids with a colloid content, fluids with a low solids content, or polymer-based fluids.

In fact, this type of polymer presents practically no problems of incompatibility in the presence of other additives generally used in particular in drilling fluids.

The invention will be better understood and its characteristics will be better appreciated by reading the following experiments, which are not limiting, illustrated in particular by the attached figures wherein:

Figure 1:
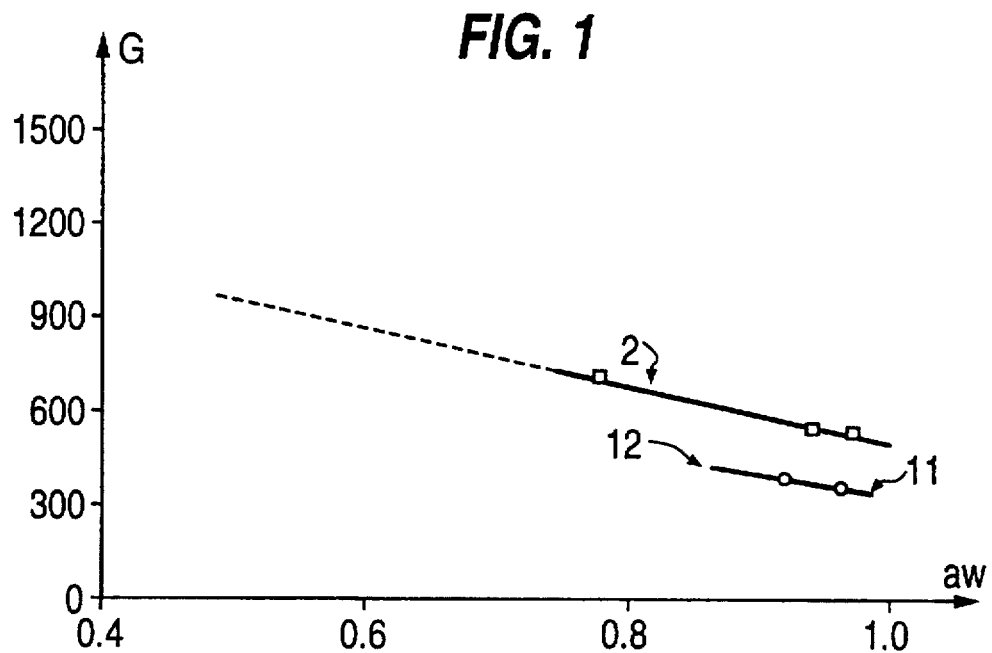
FIG. 1 represents the swelling of a sample contacted by a polymer according to the invention.

The properties and advantages of the polymer here called H3 are demonstrated by the tests described below. The H3 structure is an acrylate/butyl acrylate copolymer containing substantially 20% molecular weight of butyl acrylate and has the following structural formula:

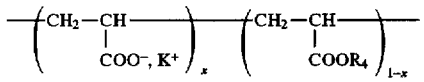

where $R_4$ is n-butyl and $x=0.8$.

The molecular weight of this polymer is essentially $17 \times 10^3$ daltons.

The behavior of the H3 polymer is compared with a polymer called H6 that has the same general formula but contains 45% molecular weight of butyl acrylate. The H6 polymer has an x value of essentially 0.55 and a molecular weight of approximately $8 \times 10^6$ daltons.

Another polymer called H1 is tested. The structure of H1 corresponds to Structure a) described above and has the following formulation:

hydrophilic part: $(CH_2CH_2O)_b$, where b is between 1 and 150, hydrophobic part: $CH_3(CH_2)_{11}$, urethane part joining Hb to Hy:

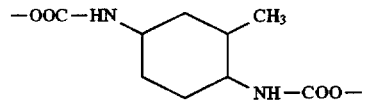

The molecular weight of this polymer is essentially 27,000 daltons.

A fourth polymer called H2 is tested. The structure of H2 follows Model c) and has partially esterified carboxylic acid groups whose hydrophilic ester groups can be of the POE type, and hydrophobic sidechain groups, with the following general formula:

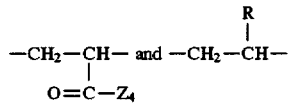

where R is a $C_{12}$ to $C_{14}$ alkyl chain and $Z_4$ is OH or $(POE)_m CH_3$, and m is between 6 and 10.

The molecular weight can be greater than approximately 20,000 daltons.

All the solutions tested will be at essentially pH 8 and in the presence of 5 g/liter of KCl except for Tests 0 and 5.

The polymer concentrations according to the invention are in the range from 1 to 10 g/liter, more specifically approximately 6 g/liter for polymers H6 and H3. The choice of these concentrations does not limit the scope of the invention.

Test 0:

To measure the extent of adsorption of the polymer according to the invention, a Green Bond montmorillonite solution exchanged in the potassium form and dispersed in the electrolyte considered is made to contact a polymer solution in the same electrolyte.

The experimental conditions are: temperature 30° C., agitation at 10 rpm for 24 hours, S/L (solid/liquid) ratio between $2 \times 10^{-4}$ and $2 \times 10^{\times 3}$. Because of autocoagulation and flocculation of the particles, the measurements are extrapolated to S/L=0. This extrapolated value corresponds to the adsorption of the polymer expressed in milligrams per gram of argillaceous particles. In the presence of 0.1 g/liter of KCl, for a nonhydrolyzed polyacrylamide, H1, and H2, the values of 700, 540, and 200 mg/g respectively are obtained.

It will be recalled that the molecular weights of these polymers are $10^7$, 27,000, and 20,000 daltons respectively.

Under the same testing conditions, a nonhydrolyzed polyacrylamide with a molecular weight of approximately 20,000 daltons is adsorbed at approximately 70 mg/g and at approximately 600 mg/g for a molecular weight of approximately $10^6$ daltons. This is described by J. Y. Bottero, M. Bruant, and J. M. Cases in J. of Colloid and Interf. Sci.; 124, No. 2, August 1988, 515–527.

At higher salinity, with approximately 10 g/liter of KCl, adsorption of the nonhydrolyzed polyacrylamide and H6 is 400 mg/g and 4300 mg/g, respectively.

Under the same conditions, adsorption of the H3 polymer is of the same order of magnitude as that of nonhydrolyzed polyacrylamide while their molecular weights are 17,000 and $10^7$ daltons, respectively.

This test shows the high adsorbability of the hydrophilic and hydrophobic polymers according to the invention on clays by comparison to polyacrylamides with comparable molecular weights.

Test 1:

To test the inhibiting power of the polymer according to the invention, a sample of Green Bond montmorillonite is placed in contact with a solution containing the polymer. The sample is in the form of a clay cake compacted at a pressure of 100 to 1500 bars and containing 43% exchangeable calcium. The various cake samples used have activities of between 0.5 and 0.98. The electrolyte used has an activity of between 1 and 0.995. In this case the activities were measured with an electrohygrometer made by the Novasina Company in Switzerland.

The experimental conditions are: temperature 30° C., solid/liquid volume ratio equal to 0.1, with gentle agitation and kinetics monitored over 24 hours.

The results are shown in FIG. 1, with the activity aw of the sample on the horizontal axis and the swelling G of the sample on the vertical axis, given as percentages.

Line 11 connects the points corresponding to cake samples with different activities. It can be seen that the hydrophilic and hydrophobic copolymer H3 is effective whatever the ratio between the activity of the electrolyte and the activity of the Green Bond cake.

This result may be compared with the work of M. E. Chenevert described by this author in "Shale Alteration by Water Adsorption" in the Journal of Petroleum Technology, September 1970 where he shows that to inhibit the swelling of a clay, it is necessary to balance the activities of the water in the drilling mud and the water in the clay. Thus far, the prior art has recommended balancing the activities or chemical potentials by adding sufficient quantities of salt to the mud, particularly potassium chloride.

The method according to the invention, however, discloses that the greater the imbalance of the activities, the greater is the effectiveness of the H3 polymer by comparison to the partially hydrolyzed polyacrylamide tested under the same conditions. The results represented by Line 2 show that swelling of the samples is distinctly higher in the presence of polyacrylamide (Line 2) than in the presence of H3 (Line 11) or H1 (12).

During the test, the swelling kinetics were monitored for 24 hours, and it was noted that the rate of swelling was low with hydrophobic polymers such as H3 and H1.

By comparison, and to offer some perspective, a cake sample similar to the foregoing was broken up completely and dispersed due to swelling when immersed in a simple brine with 5 g/liter of KCl.

Figure 2:
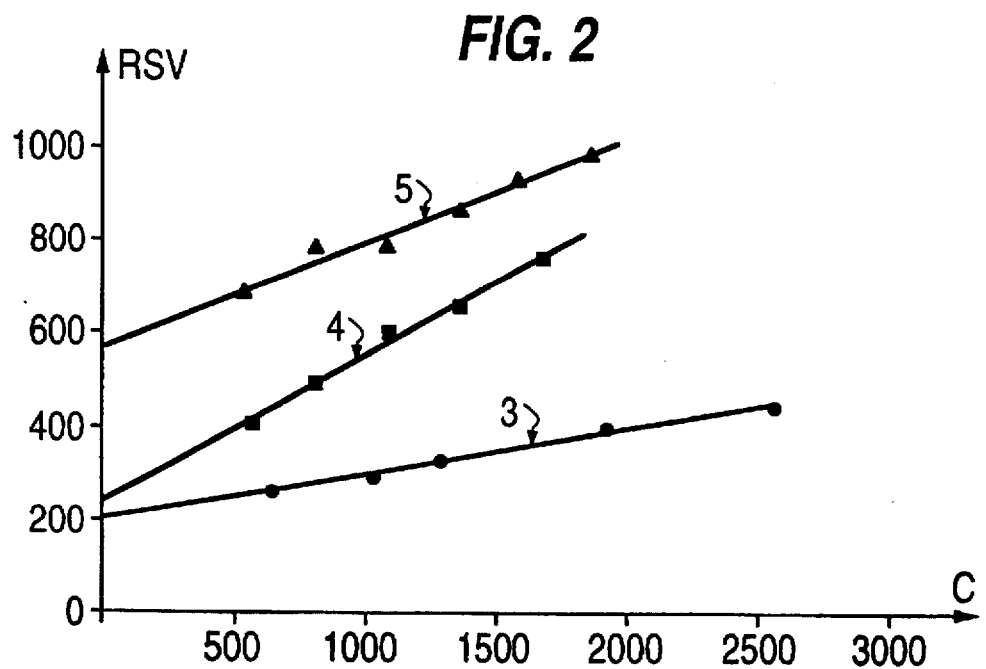
FIG. 2 represents the temperature stability of a polymer according to the invention.

Test 2:

One of the major drawbacks of the polymers known in the prior art is their temperature instability. Hence, the method according to the present invention has the advantage of retaining good structural stability at the temperatures conventionally encountered in oil drilling. If the hydrophilic and hydrophobic groups are altered, either in arrangement or in number, the inhibiting power of the solution according to the invention may be greatly attenuated. FIG. 2 shows the change in the viscosity of solutions of a polymer with a structure identical to that of H6, but with a molecular weight equal to at least $10^6$ daltons. The scale of polymer concentrations C is on the horizontal axis and the reduced specific viscosity RSV on the vertical axis. Reduced specific viscosity is equal to $(Eta_r - 1)/c$ where $Eta_r$ is relative viscosity and c, concentration.

Line 3 represents the initial viscosity of the hydrophilic and hydrophobic polymer tested as a function of its concentration, at the temperature of 30° C.

Lines 4 and 5 relate to the same polymer heated for 24 hours at 90° C. and 140° C. respectively in the presence of approximately 1 ppm of oxygen.

We observe an increase in viscosity with temperature due essentially to an increase in hydrophobic interactions.

Infrared spectroscopy shows that the structure of the tested polymer remains stable so that its inhibiting power remains intact and similar to that at the beginning.

Comparatively, under the same testing conditions, it is found that partially (17%) hydrolyzed polyacrylamide hydrolyzes to about 60% and the chain begins to break down. This test is not illustrated here.

Figure 3:
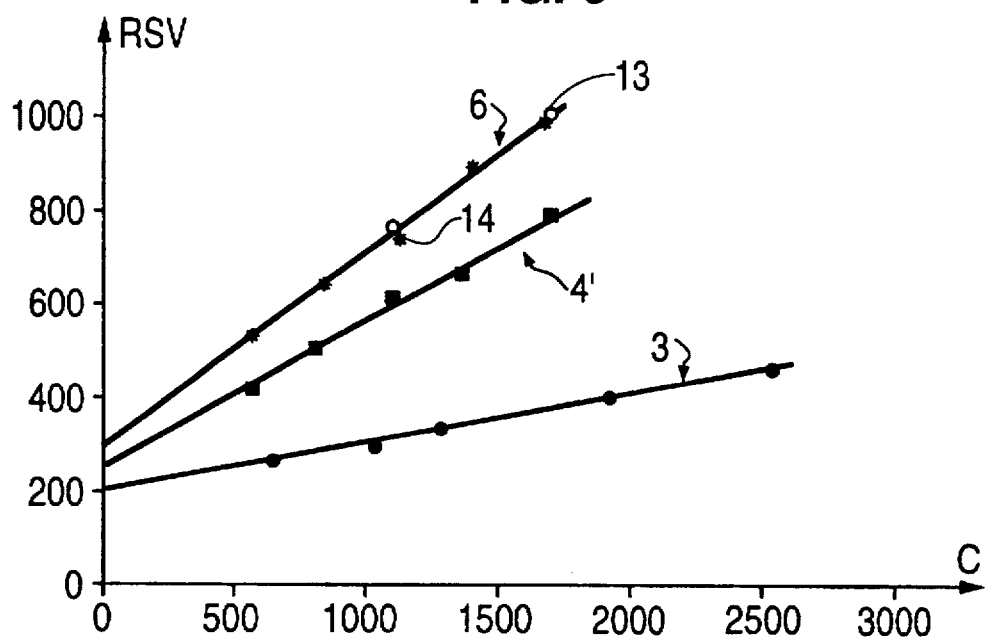
FIG. 3 represents the stability over time of a polymer according to the invention raised to 90° C.

Test 3:

To confirm the stability of the polymer heated to 90° C., the temperature was held for 48 hours and then up to 120 hours. Line 4' in FIG. 3 corresponds to 24 hours' heating. In this FIG. 3, the points represented by the crosses of the "13" type are obtained after 48 hours' heating and the points represented by the "14" type crosses, after 120 hours. After 48 hours' heating, the viscosity is seen to increase no further since Line 6 connects all the types of cross.

Figure 4:
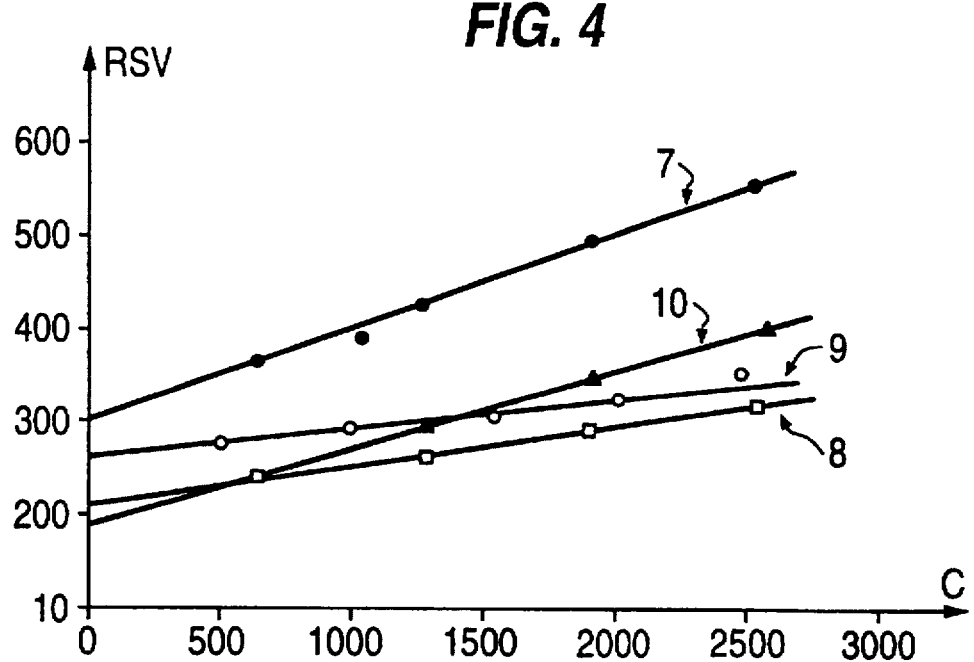
FIG. 4 represents the stability to calcium ions of a polymer according to the invention as a function of time, FIG. 5 gives the results of a disaggregation test.

Test 4:

This test relates to the influence of calcium ions on the same polymer. FIG. 4 gives the RSV of the polymer under different solution conditions:

Line 7 is a polymer solution at a concentration of 6 g/liter with 5 g/liter of KCl.

Line 8 is the previous solution to which 1 g/liter of $CaCl_2$ has been added.

Line 9 represents the previous solution after 36 hours.

Line 10 represents the previous solution after 15 days.

An increase in interactions of hydrophobic groups with each other over time is observed; this is clear if we compare Lines 9 and 10, particularly their slopes.

High stability of the polymer tested is observed under these solution conditions.

By comparison, a polyacrylamide that is 17% hydrolyzed precipitates under the same conditions and the solution viscosity decreases. This is shown in the work of J. Francois and T. Schwartz described in "Solubility Limits of Partially Hydrolyzed Polyacrylamides in the Presence of Divalent Ions," Macromol. Chem., 2775–2785, 1981, where we see that the partially hydrolyzed polyacrylamides are stable only for divalent cation concentrations well below 1 g/liter.

Moreover it is clear that the stability to calcium of the polymer tested is particularly good by comparison with the partially hydrolyzed polyacrylamide since the calcium stability limits of the latter are rapidly reached in view of its substantial hydrolysis as a function of temperature.

All the properties shown in Tests 2, 3, and 4 are attributed to the characteristics of the hydrophilic and hydrophobic polymers whatever their molecular weights. Indeed, it seems that inter- and intra-chain interactions have a favorable effect on temperature stability and in case of contamination.

Figure 5:
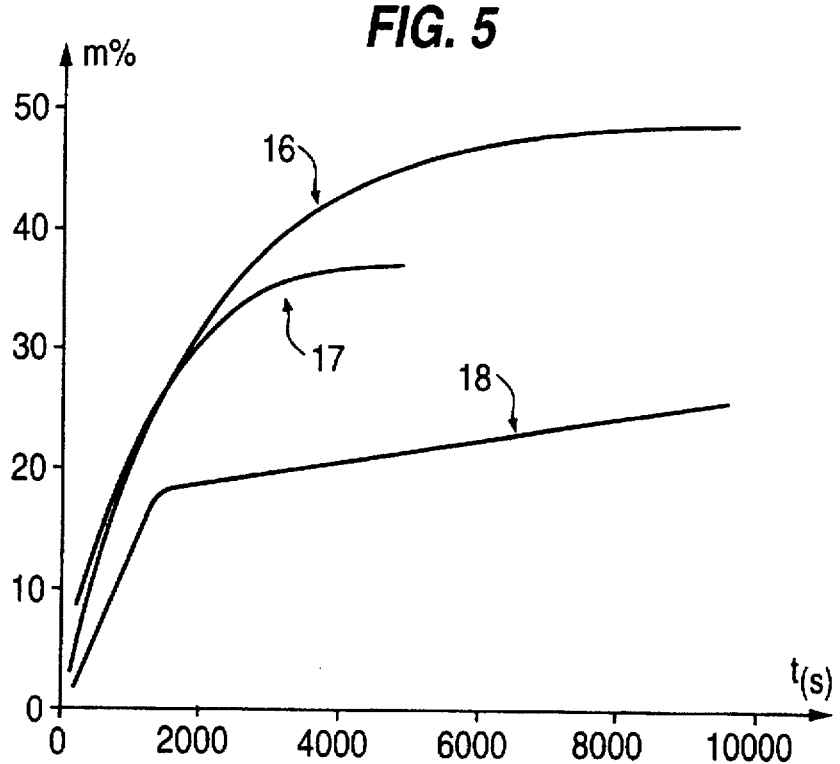

Test 5:

This test describes the influence of the adsorbed polymer on the disaggregation process of an argillaceous sample in the form of a cake. The cake is made from a clay rock called "Stone I" containing approximately 50% clay. The rock is dispersed then recompacted at 8 T. The activity of the cake thus obtained is approximately 0.82. The test consists of suspending the cake in a test solution. The solutions tested contain no KCl. The cake crumbles over time and the quantity of clay lost is measured. FIG. 5 shows the fraction of clay lost by weight m (%) as a function of time t (s). Curve 18 represents the test with a solution of H3.

By comparison, Curves 16 and 17 give the result of the same test with a solution of partially hydrolyzed polyacrylamide and with distilled water, respectively. After a time of approximately 5,000s, the distilled water crumbles 40% of clay, the polyacrylamide solution crumbles 45%, and the solution containing H3 polymer, 20%.

It is clear that the combined action of the adsorption and hydrophobicity characteristics is determining for inhibiting the swelling and dispersion of argillaceous rocks by the polymers according to the invention.

Figure 6:
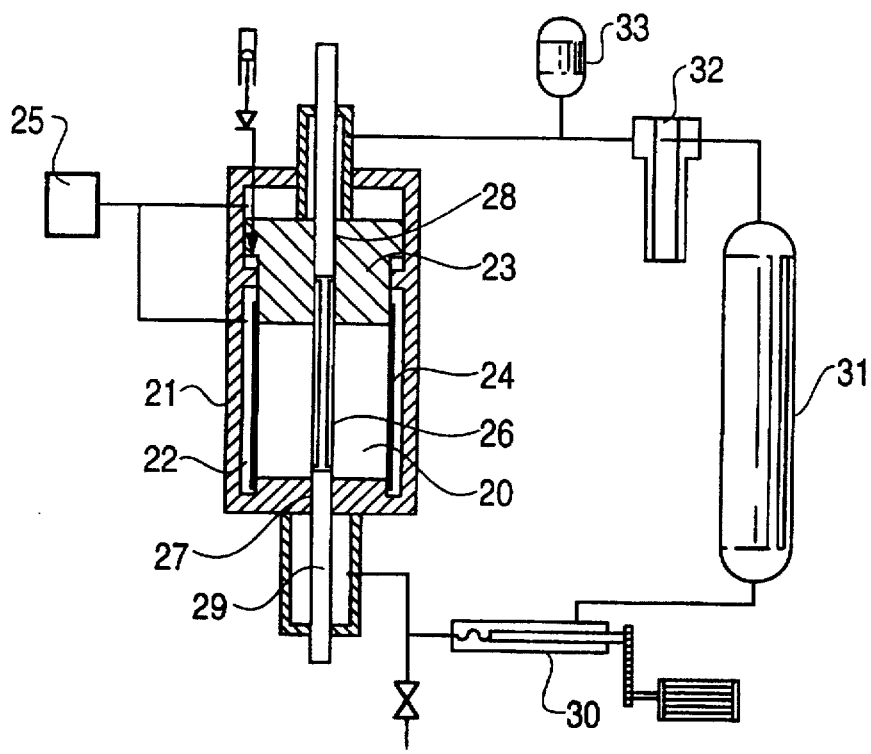
FIG. 6 shows a test cell schematically, FIG. 7 gives the test results from the cell in FIG. 6.

Test 6:

This test was conducted in the cell shown in FIG. 6. This cell simulates a drilling well and allows circulation under pressure of a fluid in a borehole in a rock sample. In addition, a calibration probe continuously measures the diameter of the borehole. Rock sample 12 is placed in an enclosure 21 with an annular space 22 delimited by a stopper 23, a jacket 24, and the body of enclosure 21. Pump 25 applies a confinement pressure on sample 20. The sample has a borehole 26 which corresponds with orifice 27 in the enclosure and orifice 28 in cap 23. These passages accommodate measuring probe 29 intended to measure the inside diameter of borehole 26. A circulation pump 30 causes test fluid to circulate in borehole 26. A reservoir 31, a filter 32, and a pulse damper 33 complete the experimental arrangement.

Sample 20 has a diameter of approximately 15 cm and is 20 cm long; borehole 26 is 2.54 cm in diameter.

The test is conducted at a confinement pressure of 260 bars and a circulation pressure of 250 bars for a flow rate of 12 l/min. The tests last approximately 48 hours.

The sample is a clay rock called "Stone I" containing approximately 50% clay. The sample was treated at a temperature of 150 bars to reduce its activity to approximately 0.9.

Figure 7:
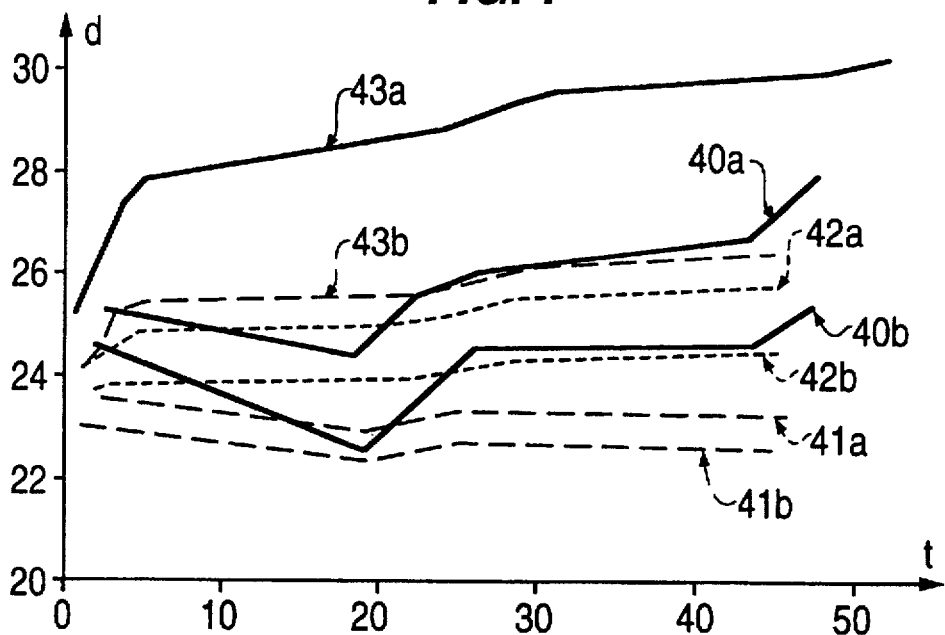

The results of the various tests performed with different fluids are shown in FIG. 7 where the horizontal axis represents time in hours and the vertical axis, the mean diameter of borehole 26 in millimeters.

Curves 40a and 40b are for distilled water.

Curves 41a and 41b are for a solution containing partially hydrolyzed polyacrylamides.

Curves 42a and 42b are for a solution containing H3.

Curves 43a and 43b are for a solution containing H6.

Indices a and b correspond to average measurements of the diameter of borehole 26 along four orthogonal directions.

It is clear that the distilled water completely destabilizes the sample. Decreases and widenings of the hole diameter are clearly observed.

Polyacrylamide (41a, 41b) somewhat stabilizes the borehole walls but does not inhibit swelling of the clay rock. Indeed, the borehole diameter is substantially reduced.

Polymer H3 has very good stabilization and inhibition. The borehole diameter is regular and very close to the initial situation.

By contrast, the H6 polymer causes very severe destabilization of the sample even in the first hours of circulation. It was also found that the H6 polymer is adsorbed by a two-stage mode bringing about formation of a layer of the multilayer type at the surface of the clay sample. When circulation is established on the sample, some of the molecules in the multilayer-type layer are no longer held at the sample surface, but entrained and recirculated. The layer thickness is then reduced substantially to the condition of a monolayer. The monolayer, about 0.2 microns thick, does not inhibit swelling sufficiently because in particular it does not effectively limit water diffusion.

By optimizing the structure and molecular weight of the polymer, an adsorbed layer thickness greater than 0.4 micron with sufficient density to limit water diffusion can be reached.

Figure 8:
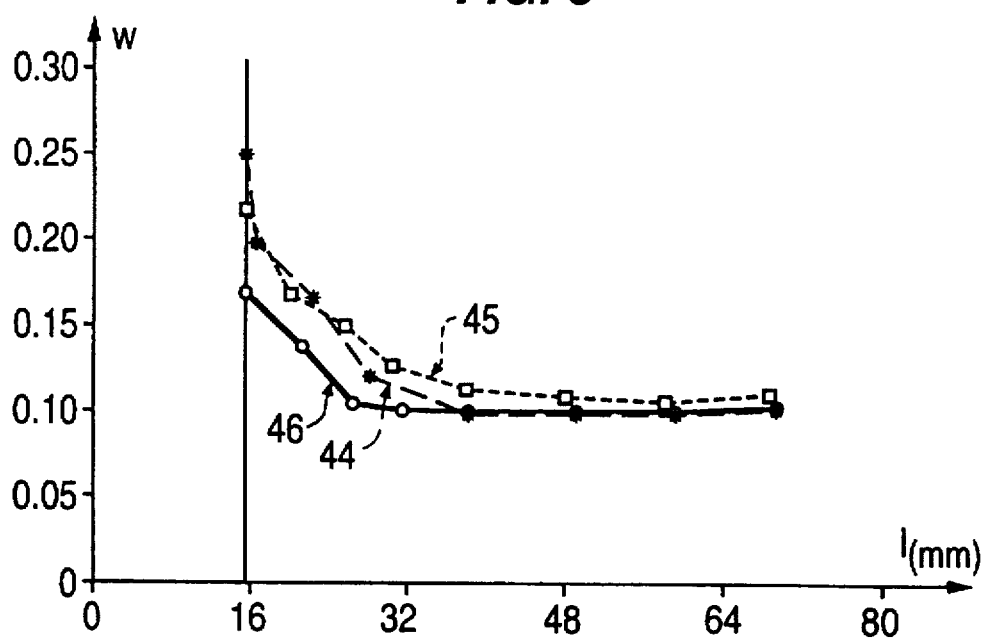
FIG. 8 represents the water content of a sample tested in the cell as a function of distance from the axis of the sample.

These results are confirmed and explained in FIG. 8 which shows on the horizontal axis the distance 1 of the samples from the borehole axis in millimeters and on the vertical axis the residual water content w of these samples.

Curves 44, 45, and 46 are for the test with distilled water, polyacrylamides, and the H3 polymer, respectively.

For a given distance from the borehole axis, it can be seen that the clay rock sample is significantly less hydrated by the water in a solution containing polymer H3.

It can be seen that the strong adsorption and strong hydrophobicity of the hydrophobic polymers strongly inhibit swelling of a clay formation.

It can be seen that, to optimize the polymers according to the invention, the circulation tests according to Test 6 are an essential supplement to tests of the static type. The latter tests, of type 0 and 1, do not show completely the action of the polymers according to the present invention.

We claim:

1. A method for stabilizing argillaceous rocks containing reactive clays in the presence of water, wherein said argillaceous rocks are placed in contact with an aqueous solution containing a polymer with hydrophilic groups (Hy) and hydrophobic groups (Hb) so that the polymer is adsorbed by said argillaceous rocks, said groups being able to inhibit swelling of said argillaceous rocks characterized in that:

the hydrophobic groups contain $C_1$–$C_{30}$ alkyl groups, the molecular proportion of said hydrophobic groups is between 5 and 60%, said polymer has the following structure:

structure c) composed of a principal chain containing units with hydrophilic groups Hy and units with hydrophobic side-chains Hb, constituting a "comb-type" structure, said structure having partially esterified carboxylic acid groups whose hydrophilic ester groups are of the POE type, and units with a hydrophobic side-chain having the following general formulas:

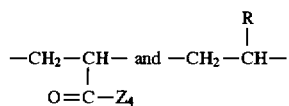

where R is a hydrophobic chain, $Z_4$ is OH or (POE)$R'_1$, and $R'_1$ is a $C_1$–$C_{30}$ alkyl, aryl, or alkylaryl radical and the molecular weight is greater than approximately 20,000 daltons.

2. Method according to claim 1 characterized in that, in said polymer with Structure c), R is a $C_{12}$ to $C_{14}$ alkyl chain and $Z_4$ is OH or (POE)$_m$CH$_3$, and m is from 6 to 10.

3. Method according to claim 1 characterized by the aqueous solution having between 1 and 10 g/liter of hydrophilic and hydrophobic polymer.

4. Method according to claim 1, wherein the argillaceous rock containing reactive clays in the presence of water comprise fluids for drilling, fracturing, well treatment, or assisted recovery.

5. A method according to claim 1, wherein R is a $C_{12}$–$C_{14}$ alkyl chain and $Z_4$ is OH or (POE)$_m$CH$_3$ and m is from 6 to 10.

* * * * *